US012119629B2

(12) United States Patent
Wan

(10) Patent No.: US 12,119,629 B2
(45) Date of Patent: Oct. 15, 2024

(54) JUNCTION BOX AND ELECTRONIC DEVICE ASSEMBLY SYSTEM

(71) Applicant: HUAWEI TECHNOLOGIES CO., LTD., Guangdong (CN)

(72) Inventor: Junping Wan, Hangzhou (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 401 days.

(21) Appl. No.: 17/581,768

(22) Filed: Jan. 21, 2022

(65) Prior Publication Data

US 2022/0149606 A1  May 12, 2022

Related U.S. Application Data

(63) Continuation of application No. PCT/CN2020/083403, filed on Apr. 5, 2020.

(30) Foreign Application Priority Data

Jul. 24, 2019 (CN) .......................... 201910673729.8

(51) Int. Cl.
H04N 23/57 (2023.01)
H02G 3/08 (2006.01)
(Continued)

(52) U.S. Cl.
CPC ............. *H02G 3/088* (2013.01); *H02G 3/083* (2013.01); *H04N 23/51* (2023.01); *H04N 23/57* (2023.01); *F21S 8/086* (2013.01)

(58) Field of Classification Search
CPC ........ H02G 3/088; H02G 3/083; H02G 3/086; H02G 3/20; H04N 23/51; F21S 8/086
See application file for complete search history.

(56) References Cited

U.S. PATENT DOCUMENTS 6,268,882 B1  7/2001  Elberbaum
6,992,723 B1 * 1/2006  Wulf ................ G08B 13/19619
                                                    348/374

(Continued)

FOREIGN PATENT DOCUMENTS

CN         1616834 A    5/2005
CN       101240806 A    8/2008
(Continued)

Primary Examiner — Timothy J Thompson
Assistant Examiner — Paramita Ghosh
(74) Attorney, Agent, or Firm — WOMBLE BOND DICKINSON (US) LLP

(57) ABSTRACT

A junction box and an electronic device assembly system relate to the field of infrastructure technologies. The junction box includes an accommodation chamber configured to accommodate a wire and a sealing cap configured to seal the wire. An upper cover of the accommodation chamber is provided with a first through-hole for wiring, a base of the accommodation chamber is provided with a second through-hole for wiring, and a side wall of the accommodation chamber is provided with one or more operation windows. The upper cover of the accommodation chamber is provided with a first installation position for installing to a pole, and the base of the accommodation chamber is provided with a second installation position for installing to an electronic device. The sealing cap includes a third through-hole for wiring and a fourth through-hole for wiring.

16 Claims, 7 Drawing Sheets

(51) Int. Cl.
*H04N 23/51* (2023.01)
*F21S 8/08* (2006.01)

(56) References Cited

U.S. PATENT DOCUMENTS

| | | |
|---|---|---|
| 9,394,919 B1 | 7/2016 | Byrne et al. |
| 10,638,024 B1* | 4/2020 | Dresang ................ H04N 23/52 |
| 2003/0063977 A1 | 4/2003 | Steeves LeBlanc et al. |
| 2005/0007488 A1* | 1/2005 | Arbuckle ............... H04N 23/51 |
| | | 348/E5.025 |
| 2014/0265774 A1 | 9/2014 | Stewart, Jr. et al. |
| 2015/0362172 A1 | 12/2015 | Gabriel et al. |

FOREIGN PATENT DOCUMENTS

| | | |
|---|---|---|
| CN | 203691126 U | 7/2014 |
| CN | 207396432 U | 5/2018 |
| CN | 208349118 U | 1/2019 |
| CN | 208606095 U | 3/2019 |
| JP | H11308497 A | 11/1999 |
| JP | 3998324 B2 | 10/2007 |
| JP | 2010282316 A | 12/2010 |

* cited by examiner

JUNCTION BOX AND ELECTRONIC DEVICE ASSEMBLY SYSTEM

CROSS-REFERENCE TO RELATED APPLICATIONS

This is a continuation of International Patent Application No. PCT/CN2020/083403, filed on Apr. 5, 2020, which claims priority to Chinese Patent Application No. 201910673729.8, filed on Jul. 24, 2019. The disclosures of the aforementioned applications are hereby incorporated by reference in their entireties.

TECHNICAL FIELD

This application relates to the field of infrastructure technologies, and in particular, to a junction box and an electronic device assembly system.

BACKGROUND

Various indoor and outdoor electronic devices, such as cameras and street lights, are mostly installed on a pole. For example, a spherical camera may be installed on a pole.

In an application scenario, a tubular support is vertically installed above a tubular pole, and an electronic device is installed on the tubular support. An installation process may be: First, a skilled person leads various signal cables and power cables into the pole and the tubular support, and leads these cables out from a position, for installing the electronic device, of the tubular support, to connect to the electronic device. Next, wires such as the signal cables and the power cables are connected to corresponding interfaces of the electronic device. This wiring process requires assistance of two skilled persons. In some embodiments, one skilled person holds the electronic device, and the other skilled person performs the wiring work. After the wiring is completed, various wires are stuffed into the tubular support, and then the electronic device is fixedly installed to the tubular support.

In a process of implementing this application, the inventor finds that a related technology has at least the following problems:

In a process of installing and repairing the electronic device, cooperation of at least two skilled persons is required. Consequently, the process is relatively complex, and work efficiency is relatively low.

SUMMARY

Embodiments of this application provide a junction box and an electronic device assembly system to resolve a problem in a related technology. The technical solutions are as follows:

In some embodiments (sometimes referred to as, "a first aspect"), a junction box is provided. The junction box includes an accommodation chamber configured to accommodate a wire and a sealing cap configured to seal the wire. An upper cover of the accommodation chamber is provided with a first through-hole for wiring, a base of the accommodation chamber is provided with a second through-hole for wiring, and a side wall of the accommodation chamber is provided with one or more operation windows. The upper cover of the accommodation chamber is provided with a first installation position for installing to a pole, and the base of the accommodation chamber is provided with a second installation position for installing to an electronic device. The sealing cap is detachably installed to the accommodation chamber, the sealing cap includes a third through-hole for wiring and a fourth through-hole for wiring, and the one or more operation windows are shielded by the sealing cap when the sealing cap and the accommodation chamber are in an installed state.

In the solution shown in this embodiment of this application, the accommodation chamber is configured to accommodate the wire, and is operation space in which a skilled person performs wiring. Atop of the accommodation chamber is configured to be fastened to the pole, for example, may be fastened to a tubular support of the pole. A bottom of the accommodation chamber is configured to be fastened to the electronic device. The side wall of the accommodation chamber is provided with at least one window for the skilled person to reach in for operation. To preventing dust, rain, and the like from entering the accommodation chamber, correspondingly, the accommodation chamber is hooded by the sealing cap. The sealing cap is detachably fastened to the accommodation chamber.

In this way, when installing the electronic device, first, the skilled person sequentially leads a wire of the electronic device through the fourth through-hole of the sealing cap 2 and the second through-hole 121 of the accommodation chamber 1 into the accommodation chamber, and sequentially leads a wire in the pole through the third through-hole 201 of the sealing cap 2 and the first through-hole 111 of the accommodation chamber 1 into the accommodation chamber; then, fastens the top of the accommodation chamber to the pole, and fastens the bottom of the accommodation chamber to the electronic device; further, mechanically stabilizes the electronic device; and next, may stretch the hands into the accommodation chamber to perform a wiring work. As can be learned, in the process of installing the electronic device, another skilled person does not need to hold the electronic device, and one skilled person can complete hanging and installation of the electronic device, thereby simplifying the installation process of the electronic device and improving work efficiency.

In some embodiments, a position that is on the upper cover and that corresponds to the first through-hole is provided with a first installation tube, and a position that is on the base and that corresponds to the second through-hole is provided with a second installation tube; and the first installation position is provided at a nozzle position of the first installation tube that is far away from the upper cover, and the second installation position is provided at a nozzle position of the second installation tube that is far away from the base.

In some embodiments, the first installation tube corresponds to the position of the first through-hole. For example, the first through-hole is located in the first installation tube, in other words, an inner diameter of the first installation tube is greater than a diameter of the first through-hole. For another example, the diameter of the first through-hole is equal to the inner diameter of the first installation tube. The first installation position is provided on the first installation tube. In this way, after the first installation tube is fastened to the pole, the first through-hole can be isolated from the outside, thereby preventing dust, rain, and the like from entering the accommodation chamber through the first through-hole.

Similarly, the second installation tube corresponds to the position of the second through-hole. For example, the second through-hole is located in the second installation tube, in other words, an inner diameter of the second installation tube is greater than a diameter of the second through-hole.

For another example, the diameter of the second through-hole is equal to the inner diameter of the second installation tube. The second installation position is provided on the second installation tube. In this way, after the second installation tube is fastened to the electronic device, the second through-hole can be isolated from the outside, thereby preventing dust, rain, and the like from entering the accommodation chamber through the second through-hole.

As described above, the first installation position is provided on the first installation tube, for example, provided at the nozzle position of the first installation tube that is far away from the upper cover. In some embodiments, the nozzle position of the first installation tube that is far away from the upper cover may be provided with a thread, which may be an internal thread or an external thread. For example, the first installation tube may be provided with an external thread, and the tubular support of the pole may be provided with an internal thread matching the external thread of the first installation tube, so that the upper cover of the accommodation chamber is installed to the tubular support of the pole through the threads by using the first installation tube on the upper cover.

Similarly, the second installation position may be provided at the nozzle position of the second installation tube that is far away from the base. In some embodiments, the nozzle position of the second installation tube that is far away from the base may be provided with a thread, which may be an internal thread or an external thread. For example, the second installation tube may be provided with an internal thread, and the electronic device may be provided with an external thread matching the internal thread of the second installation tube, so that the base of the accommodation chamber is installed to the electronic device through the threads by using the second installation tube on the base.

In some embodiments, a distance between an edge of the operation window that is close to the base and the base is greater than a target value.

In some embodiments, when the distance between the edge of the operation window that is close to the base (namely, a lower edge of the operation window) and the base is relatively large, rain on an inner surface of a cap wall does not flow upwards that far, thereby preventing the water on the inner surface of the cap wall from entering the accommodation chamber through the operation window.

The distance between the lower edge of the operation window and the base may be determined based on a maximum distance by which water flows upwards. For example, a minimum distance between the lower edge of the operation window and the base is greater than the maximum distance by which water flows upwards. For example, the distance between the lower edge of the operation window and the base may be set to 15 millimeters or the like.

In some embodiments, the sealing cap includes a cap wall, and a height of the cap wall is greater than or equal to a height of the side wall of the accommodation chamber.

In some embodiments, the cap wall is taller than the side wall of the accommodation chamber. Therefore, when the sealing cap is installed to the accommodation chamber, the cap wall of the sealing cap can wrap the side wall within the sealing cap. Further, the operation window on the side wall is also located within the sealing cap.

In some embodiments, the sealing cap further includes a cap cover, and the cap cover is fastened to an end portion of the cap wall. All third through-holes are provided on the cap cover. A diameter of the third through-hole is greater than or equal to a diameter of the first through-hole, and the fourth through-hole is formed by an edge of the cap wall that is far away from the cap cover. The cap cover of the sealing cap is detachably installed to the upper cover of the accommodation chamber, and the cap wall of the sealing cap is attached to the side wall of the accommodation chamber when the cap cover and the upper cover are in an installed state.

In some embodiments, the upper cover of the accommodation chamber is provided with a first through-hole for wiring. Therefore, correspondingly, when the sealing cap is hooded on the accommodation chamber, the position that is on the cap cover and that corresponds to the first through-hole is provided with the third through-hole, so that wiring is not blocked, and a client cable can be passed through the third through-hole on the cap cover and the first through-hole on the upper cover and enters the accommodation chamber.

Similarly, the fourth through-hole 202 of the sealing cap 2 is also for wiring, so that a device-end cable can be passed through the fourth through-hole 202 on the sealing cap 2 and the second through-hole 121 on the base 12 and enters the accommodation chamber 1.

In some embodiments, the upper cover is provided with a first ring groove, and a first sealing ring is placed in the first ring groove; and the first sealing ring is located between the cap cover of the sealing cap and the upper cover of the accommodation chamber when the cap cover and the upper cover are in the installed state.

In some embodiments, an outer surface of the upper cover (that is, the surface outside the accommodation chamber) is provided with the first ring groove. An inner diameter of the first ring groove is greater than a diameter of the third through-hole on the cap cover, so that the first sealing ring placed in the first ring groove is pressed between the cap cover and the upper cover when the cap cover and the upper cover are in the installed state. In addition, a thickness of the first sealing ring is greater than a groove depth of the first ring groove, so that the first sealing ring can have a sealing function between the cap cover and the upper cover.

In some embodiments, the side wall of the accommodation chamber is provided with a second ring groove, and the second ring groove is located between the operation window and an end portion of the side wall that is close to the base. A second sealing ring is placed in the second ring groove, and the second sealing ring is located between the cap wall of the sealing cap and the side wall of the accommodation chamber when the accommodation chamber and the sealing cap are in an installed state.

In some embodiments, an outer surface of the side wall (that is, the surface outside the accommodation chamber) is provided with the second ring groove, and the second ring groove is formed around the outer surface of the side wall. A distance between a lower groove wall of the second ring groove and the base is less than a distance between a lower edge of the cap wall and the base when the sealing cap and the accommodation chamber are in the installed state, so that the second sealing ring placed in the second ring groove is pressed between the cap wall and the side wall. In addition, a thickness of the second sealing ring is greater than a groove depth of the second ring groove, so that the second sealing ring can have a sealing function between the cap wall and the side wall.

In some embodiments, the sealing cap is made of a non-metallic material.

In some embodiments, the non-metallic sealing cap can prevent corrosion and rust, and furthermore, can prevent a signal from being shielded when the junction box is configured to accommodate an expansion component.

In some embodiments (sometimes referred to as, "a second aspect"), an electronic device assembly system is provided. The electronic device assembly system includes an electronic device, a pole, a tubular support, and the junction box according to the first aspect. The tubular support is vertically installed on the pole, the upper cover of the junction box is fastened to the tubular support at the first installation position, and the base of the junction box is fastened to the electronic device at the second installation position In some embodiments, the pole is fastened to the ground, and the tubular support is fastened to the pole. For example, the tubular support is fastened to an end portion of the pole that is far away from the ground. The upper cover of the junction box is fastened to the tubular support at the first installation position. For example, an end portion of the tubular support that is far away from the pole is provided with a connection tube. The upper cover of the junction box is fastened to the connection tube at the first installation position. For example, the first installation tube on the upper cover is fastened to the connection tube.

Based on the foregoing descriptions, when a skilled person installs the electronic device, a possible installation process may be: First, the skilled person fastens the pole to the ground; then, fixedly installs the tubular support to the end portion of the pole that is far away from the ground; next, fastens the top of the junction box to the tubular support, for example, may install the first installation tube on the upper cover to the connection tube of the tubular support through a thread; and subsequently, may lead the wire led out of the pole into the accommodation chamber of the junction box, and lead a wire led out of the electronic device into the accommodation chamber of the junction box. Then, the skilled person installs the electronic device to the bottom of the junction box, for example, installs the electronic device to the second installation tube of the base through a thread. After completing fastening and installation of the electronic device and wire leading, the skilled person performs a wiring work. As can be learned, in the wiring process, the skilled person does not require assistance of another skilled person, thereby simplifying the installation process of the electronic device and improving work efficiency.

In some embodiments, the electronic device assembly system further includes an expansion component. The expansion component is located in the junction box, and the expansion component is electrically connected to the electronic device.

In some embodiments, for an electronic device that does not have some functions, to enable the electronic device to have the functions, the electronic device may be modified. For example, for an electronic device that does not have a Bluetooth function, a Bluetooth component may be added to an accommodation chamber. In a related technology, before a function of an electronic device is expanded, a structure of the electronic device needs to be changed to accommodate an expansion component. However, in this solution, the expansion component may be directly placed in the junction box, and a structure of the electronic device does not need to be changed, thereby simplifying a modification process of the electronic device.

In some embodiments, the electronic device is a camera device, the electronic device includes a housing and a camera, and the camera is installed in the housing; and the housing is provided with a third installation position adapted to the second installation position of the base, and the base of the junction box is fastened to the housing of the electronic device through cooperation of the second installation position and the third installation position.

The electronic device may be any device disposed in the air by using the pole, such as a smart street lamp or a camera device. In this embodiment, an example in which the electronic device is a camera device may be used for illustration.

In some embodiments, the top of the electronic device is fastened to the bottom of the junction box. For example, the base 12 of the junction box is provided with the second installation tube 122, and the housing 51 of the electronic device 5 is provided with a third installation tube 511. Further, the second installation tube 122 and the third installation tube 511 may be provided with threads that match with each other. For example, the second installation tube 122 is provided with an internal thread (namely, the second installation position), and the third installation tube 511 is provided with an external thread (namely, the third installation position), so that the second installation tube 122 may be connected to the third installation tube 511 through the threads. In this way, the electronic device 5 is fastened to the junction box.

Beneficial effects brought by the technical solutions provided in the embodiments of this application include at least the following:

In some embodiments, the electronic device may be installed on the pole by using the junction box. The junction box may include the accommodation chamber and the sealing cap, and the sealing cap is detachably installed to the accommodation chamber. The side wall of the accommodation chamber is provided with one or more operation windows for a skilled person to perform a wiring work. When the electronic device is installed by using the junction box, a wire may be led out of the electronic device into the accommodation chamber, and a wire led out of the pole is led into the accommodation chamber. Then, the upper cover of the accommodation chamber is fastened to the pole, and the electronic device is fastened to the base of the accommodation chamber, so that the electronic device is fixedly installed to the pole by using the junction box. Subsequently, the wiring work may be performed in the accommodation chamber through the operation window. After the wiring work is completed, the sealing cap is hooded on the accommodation chamber, so that the operation window on the accommodation chamber is shielded by the sealing cap to prevent dust. As can be learned, in the process of installing the electronic device, one skilled person can complete installation of the electronic device without assistance of another skilled person, thereby simplifying the installation process of the electronic device and improving work efficiency.

DESCRIPTION OF REFERENCE NUMERALS

| | |
|---|---|
| 1. Accommodation chamber | 2. Sealing cap |
| 3. First sealing ring | 4. Second sealing ring |
| 5. Electronic device | 6. Pole |
| 7. Tubular support | 11. Upper cover |
| 12. Base | 13. Side wall |
| 21. Cap wall | 22. Cap cover |
| 23. Cap brim | 51. Housing |
| 52. Camera | 71. Connection tube |
| 111. First through-hole | 112. First installation tube |
| 113. First ring groove | 121. Second through-hole |
| 122. Second installation tube | 131. Operation window |
| 132. Second ring groove | 201. Third through-hole |
| 202. Fourth through-hole | 511. Third installation tube |

DESCRIPTION OF EMBODIMENTS

An embodiment of this application provides a junction box. The junction box is configured to electrically connect an electronic device to another device. The electronic device may be a camera, a street lamp, an alarm, or the like. For ease of description, a camera may be used for illustration in the accompanying drawing in this embodiment. When being used, the electronic device may need to be electrically connected to another device by using a wire, for example, it may need to be electrically connected to a power supply device, or it may need to be electrically connected to a wireless network device. Correspondingly, in a process of installing the electronic device to a pole, a wiring work between the electronic device and the another device may be needed.

Figure 1:
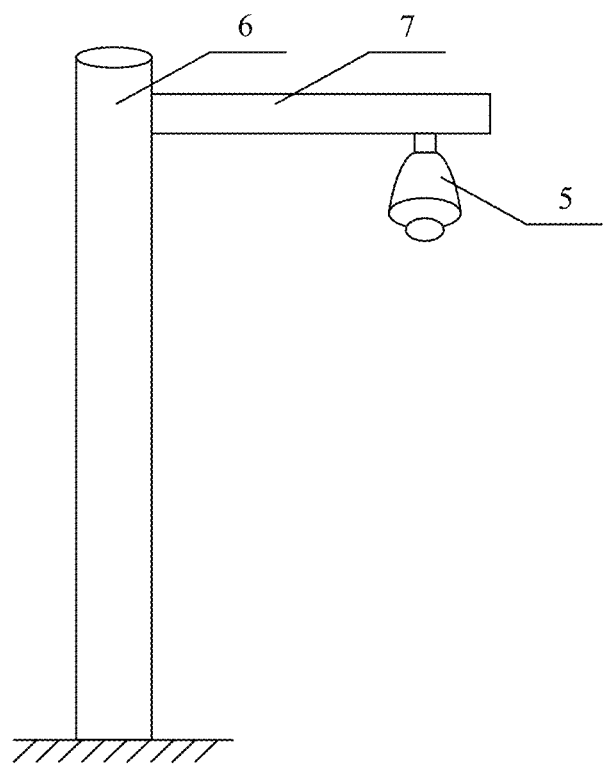
FIG. 1 is a schematic structural diagram of an electronic device assembly system according to a related technology.

In a related technology, as shown in FIG. 1, an electronic device 5 is directly installed on a tubular support 7, so that an example installation process of the electronic device is usually: One skilled person holds the electronic device, another skilled person performs the wiring work. The electronic device is to be installed after the wiring work is completed. When a connection between the electronic device and the another device is faulty, a skilled person first detaches the electronic device from the pole. In this case, one skilled person holds the electronic device, and another skilled person checks a line between the electronic device and the another device.

As can be learned, in the installation and detachment processes of the electronic device, at least two skilled persons are required to cooperate with each other. The operations are relatively complex and work efficiency is relatively low. To resolve these problems, the embodiments provide a junction box.

Figure 2:
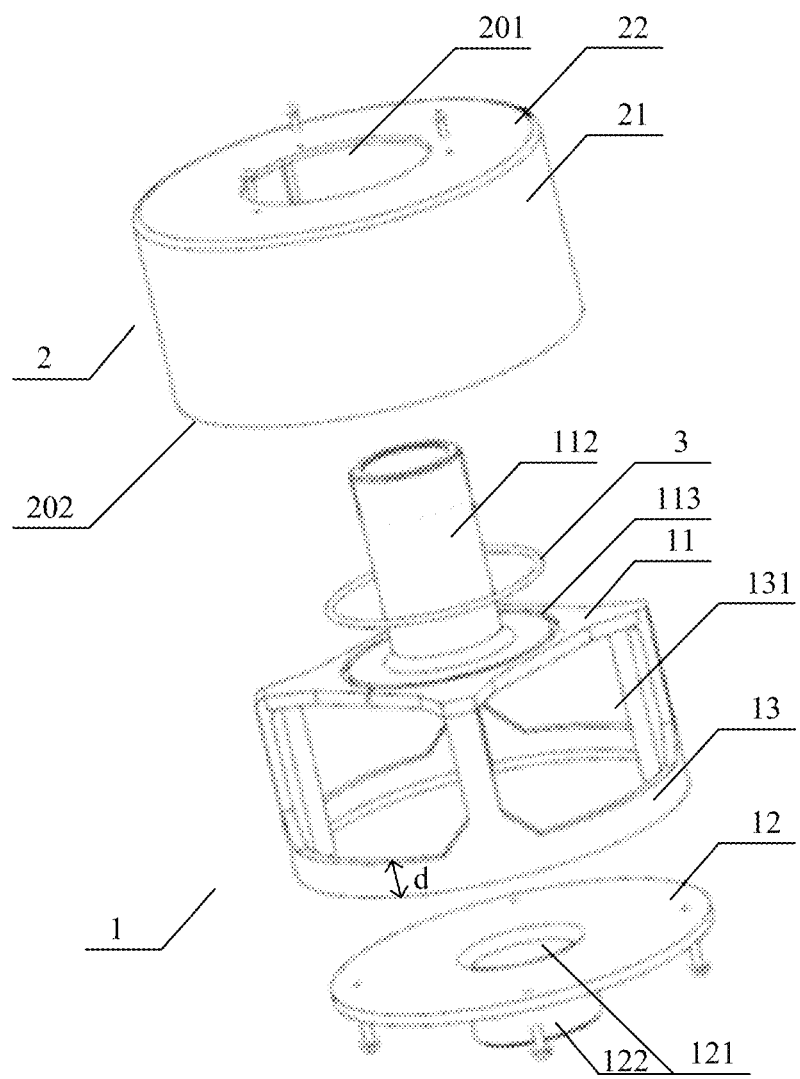
FIG. 2 is a schematic structural diagram of a junction box according to an embodiment of this application.
Figure 3:
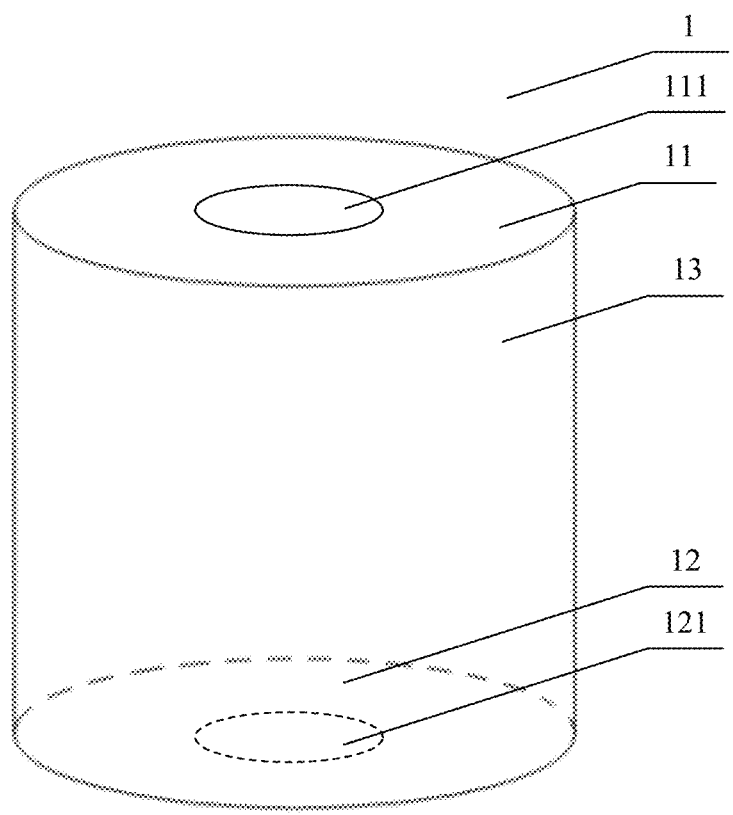
FIG. 3 is a schematic structural diagram of an accommodation chamber of a junction box according to an embodiment of this application.
Figure 4:
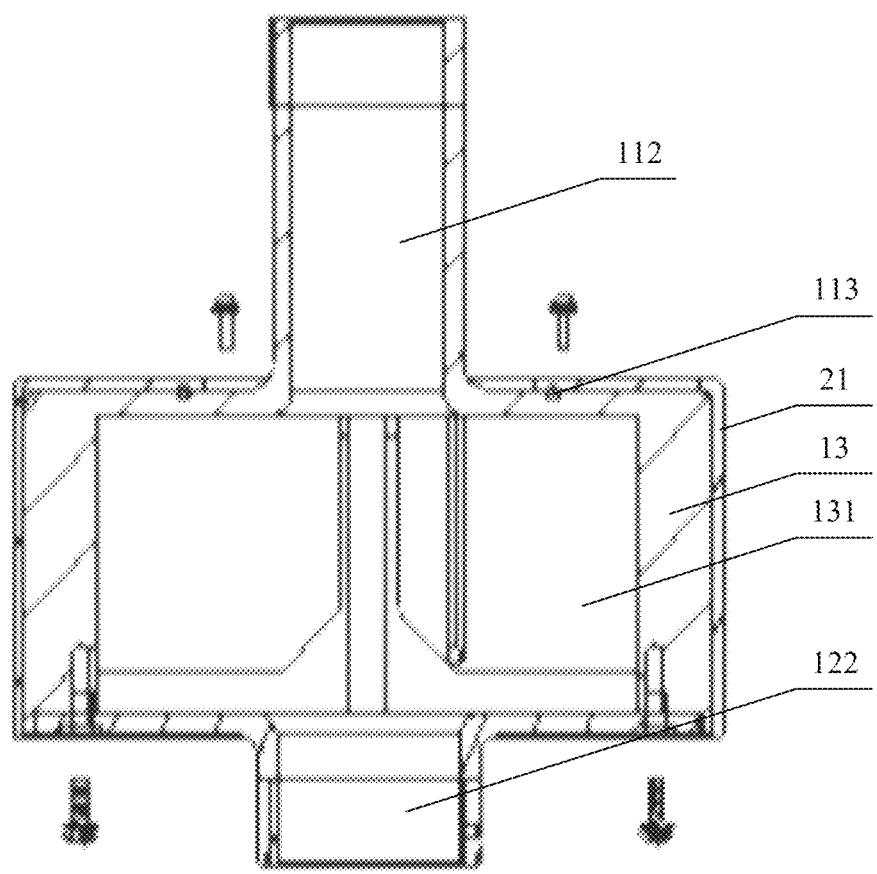
FIG. 4 is a schematic structural diagram of a junction box according to an embodiment of this application.

As shown in FIG. 2, the junction box includes an accommodation chamber 1 configured to accommodate a wire and a sealing cap 2 configured to seal the wire. As shown in FIG. 3, an upper cover 11 of the accommodation chamber 1 is provided with a first through-hole 111 for wiring, and a base 12 of the accommodation chamber 1 is provided with a second through-hole 121 for wiring. As shown in FIG. 2, a side wall 13 of the accommodation chamber 1 is provided with at least one operation window 131, the upper cover 11 of the accommodation chamber 1 is provided with a first installation position for installing to the pole, and the base 12 of the accommodation chamber 1 is provided with a second installation position for installing to the electronic device. As shown in FIG. 2, the sealing cap 2 may include a third through-hole 201 and a fourth through-hole 202. The third through-hole 201 and the fourth through-hole 202 are both for wiring. The sealing cap 2 is detachably installed to the accommodation chamber 1. As shown in FIG. 4, the at least one operation window 131 is shielded by the sealing cap 2 when the sealing cap 2 and the accommodation chamber 1 are in an installed state.

The junction box can hide wires, and therefore, may also be referred to as a wire hiding box.

The accommodation chamber 1 is configured to provide operation space for a wiring work of a skilled person. The operation window 131 on the side wall 13 of the accommodation chamber 1 is configured to enable the skilled person to stretch the hands into the accommodation chamber 1 for a wiring operation.

The first through-hole 111 and the second through-hole 121 of the accommodation chamber 1 and the third through-hole 201 and the fourth through-hole 202 of the sealing cap 2 are all for wiring. For example, the first through-hole 111 and the third through-hole 201 are configured to enable a wire led out of the pole to be led into the accommodation chamber 1, and the second through-hole 121 and the fourth through-hole 202 are configured to enable a wire led out of the electronic device to be led into the accommodation chamber 1.

The sealing cap 2 is configured to: after the skilled person completes the wiring work, shield the operation window 131 of the accommodation chamber 1 to prevent water, dust, and the like from entering the junction box through the operation window 131, thereby avoiding affecting normal use and a service life of the electronic device fastened to the junction box.

The first installation position and the second installation position may also be referred to as a first installation structure and a second installation structure. For example, if threads are used for connection, the first installation position and the second installation position may be thread structures. For another example, if welding is used for connection, the first installation position and the second installation position may be welding positions. For still another example, if it is a buckling connection, the first installation position and the second installation position may be buckle structures, clamp structure, or the like. The first installation position is configured to fasten the junction box to the pole. The second installation position is configured to fasten the junction box to the electronic device.

In the following description, words such as upper and lower indicating locations are introduced. The gravity direction may be lower, and the direction opposite to the gravity direction may be upper. Correspondingly, the top of the accommodation chamber 1 is the upper portion of the accommodation chamber 1, and the bottom of the accommodation chamber 1 is the lower portion of the accommodation chamber 1.

During implementation, the accommodation chamber 1 is configured to accommodate the wire, and is operation space in which a skilled person performs wiring. The top of the accommodation chamber 1 is configured to be fastened to the pole, for example, may be fastened to a tubular support of the pole. The bottom of the accommodation chamber 1 is configured to be fastened to the electronic device. The side wall of the accommodation chamber 1 is provided with at least one window for the skilled person to reach in for operation. To preventing dust, rain, and the like from entering the accommodation chamber 1, correspondingly, the accommodation chamber 1 is hooded by the sealing cap 2. The sealing cap 2 is detachably fastened to the accommodation chamber 1.

In this way, when installing the electronic device, first, the skilled person leads a wire of the electronic device into the accommodation chamber 1, and leads a wire in the pole into the accommodation chamber 1; then, fastens the top of the accommodation chamber 1 to the pole, and fastens the bottom of the accommodation chamber 1 to the electronic device; further, mechanically stabilizes the electronic device; and next, may stretch the hands into the accommodation chamber 1 to perform a wiring work. As can be learned, in the process of installing the electronic device, another skilled person does not need to hold the electronic device, and one skilled person can complete hanging and installation of the electronic device, thereby simplifying the installation process of the electronic device and improving work efficiency.

The skilled person may separately lead the wire in the pole and the wire of the electronic device into the accommodation chamber 1 first, and then fasten the junction box and the electronic device; or may fasten the junction box and the electronic device first, and then lead the wire in the pole and the wire of the electronic device into the accommodation chamber 1. The skilled person may flexibly control an operation order based on actual situations. However, the wiring work is performed after the installation and fastening works, so that the electronic device has been fastened to the pole when the skilled person performs the wiring work, and another skilled person does not need to hold the electronic device. In this way, one skilled person can complete hanging and installation of the electronic device, thereby simplifying the installation process of the electronic device and improving work efficiency.

In the following, for ease of description, the wire led from the pole to the accommodation chamber 1 may be referred to as a client cable, and the wire led from the electronic device to the accommodation chamber 1 may be referred to as a device-end cable.

An example structure of the junction box may be as follows:

As shown in FIG. 2, the accommodation chamber 1 may be a cavity formed by the upper cover 11, the base 12, and the side wall 13; and may be box-shaped or tank-shaped. For example, the accommodation chamber 1 may be a quadrangular box-shaped subject, or may be a tubular subject. An example shape of the accommodation chamber 1 is not limited in this embodiment provided that a chamber can be formed. For ease of description, a tubular subject may be used for illustration. The upper cover 11, the base 12, and the side wall 13 of the accommodation chamber 1 may be processed by using integral molding. In some embodiments, a plate structure is fastened to one nozzle of the tubular side wall 13 as the upper cover 11, and a plate structure is fastened to the other nozzle of the tubular side wall 13 as the base 12. Because the side wall 13 has a thickness, the upper cover 11 and the base 12 both may be fastened to the side wall 13 by using screws. In some embodiments, a barrel wall of a barrel structure may be used as the side wall 13, a barrel bottom of the barrel structure is used as the base 12, and a plate structure is installed at a barrel mouth as the upper cover 11. In some embodiments, a barrel wall of a barrel structure is used as the side wall 13, a barrel bottom of the barrel structure is used as the upper cover 11, and a plate structure is installed at a barrel mouth as the base 12. An example manner of forming the accommodation chamber 1 is not limited in this embodiment.

To enable the wire in the pole to be led into the accommodation chamber 1, correspondingly, as shown in FIG. 3, the upper cover 11 of the accommodation chamber 1 is provided with a first through-hole 111 for wiring. Similarly, to enable the wire in the electronic device to be led into the accommodation chamber 1, correspondingly, the base 12 is provided with a second through-hole 121 for wiring.

A size of the first through-hole 111 may be related to a quantity of client cables and a total diameter of all the client cables, so that all the client cables can be passed through the first through-hole 111. Similarly, a size of the second through-hole 121 is related to a quantity of device-end cables and a total diameter of all the device-end cables, so that all the device-end cables can be passed through the second through-hole 121.

During wiring, the first through-hole 111 and the second through-hole 121 may also let dust, rain, and the like enter the accommodation chamber 1. To avoid this situation, one manner may be that a waterproof ring is sleeved on the first through-hole 111. For example, the waterproof ring may be elastic, and can tightly wind the client cables together to reduce gaps and prevent dust, rain, and the like from entering the accommodation chamber 1. Similarly, an elastic waterproof ring may also be sleeved on the second through-hole 121 to tightly wind the device-end cables together. Another waterproof manner is further described below.

During implementation, the top of the accommodation chamber 1 is configured to be fastened to the pole. Correspondingly, the upper cover 11 is provided with the first installation position for installing to the pole. The bottom of the accommodation chamber 1 is configured to be fastened to the electronic device. Correspondingly, the base 12 of the accommodation chamber 1 is provided with the second installation position for installing to the electronic device. The upper cover 11 may be fixedly installed to the pole by using a bolt, a clamp, or a thread. Similarly, the base 12 may be fixedly installed to the electronic device by using a bolt, a clamp, or a thread. An example manner of installing the upper cover 11 to the pole and an example manner of installing the electronic device to the base 12 are not limited in this embodiment provided that installation can be implemented. An example in which a thread is used for fastening may be used.

As shown in FIG. 2, a position of the upper cover 11 that corresponds to the first through-hole 111 is provided with a first installation tube 112, and a position of the base 12 that corresponds to the second through-hole 121 is provided with a second installation tube 122. The first installation position is provided at a nozzle position of the first installation tube 112 that is far away from the upper cover 11, and the second installation position is provided at a nozzle position of the second installation tube 122 that is far away from the base 12.

During implementation, the first installation tube 112 corresponds to the position of the first through-hole 111. For example, the first through-hole 111 is located in the first installation tube 112, in other words, an inner diameter of the first installation tube 112 is greater than a diameter of the first through-hole 111. For another example, the diameter of the first through-hole 111 is equal to the inner diameter of the first installation tube 112. The first installation position is provided on the first installation tube 112. In this way, after the first installation tube 112 is fastened to the pole, the first through-hole 111 can be isolated from the outside, thereby preventing dust, rain, and the like from entering the accommodation chamber 1 through the first through-hole 111.

Similarly, the second installation tube 122 corresponds to the position of the second through-hole 121. For example, the second through-hole 121 is located in the second installation tube 122, in other words, an inner diameter of the second installation tube 122 is greater than a diameter of the second through-hole 121. For another example, the diameter of the second through-hole 121 is equal to the inner diameter of the second installation tube 122. The second installation position is provided on the second installation tube 122. In this way, after the second installation tube 122 is fastened to the electronic device, the second through-hole 121 can be isolated from the outside, thereby preventing dust, rain, and the like from entering the accommodation chamber 1 through the second through-hole 121.

As described above, the first installation position is provided on the first installation tube 112, for example, provided at the nozzle position of the first installation tube 112 that is far away from the upper cover 11. In some embodiments, the nozzle position of the first installation tube 112 that is far away from the upper cover 11 may be provided with a thread, which may be an internal thread or an external thread. For example, the first installation tube 112 may be provided with an external thread, and the tubular support of the pole may be provided with an internal thread matching the external thread of the first installation tube 112, so that the upper cover 11 of the accommodation chamber 1 is installed to the tubular support of the pole through the threads by using the first installation tube 112 on the upper cover 11.

Similarly, the second installation position may be provided at the nozzle position of the second installation tube 122 that is far away from the base 12. In some embodiments, the nozzle position of the second installation tube 122 that is far away from the base 12 may be provided with a thread, which may be an internal thread or an external thread. For example, the second installation tube 122 may be provided with an internal thread, and the electronic device may be provided with an external thread matching the internal thread of the second installation tube 122, so that the base 12 of the accommodation chamber 1 is installed to the electronic device through the threads by using the second installation tube 122 on the base 12.

As described above, the accommodation chamber 1 may further be used by the skilled person to perform a wiring work. Correspondingly, as shown in FIG. 2, the side wall 13 of the accommodation chamber 1 is provided with one or more operation windows 131. For example, the side wall 13 is provided with one operation window 131. Correspondingly, to enable the skilled person to stretch the hands into the accommodation chamber 1 through the operation window 131, a size of the operation window 131 needs to be greater than a size that allows the skilled person to stretch the hands into the accommodation chamber 1. To further facilitate operations of a skilled person, for another example, the side wall 13 may be provided with two operation windows 131, the two operation windows 131 are adjacent, and a size of each operation window 131 is greater than a width of a hand of most skilled persons, so that a skilled person can respectively stretch the left and right hands into the two operation windows 131 to perform a wiring work. For another example, the side wall 13 is evenly provided with a plurality of operation windows 131, and a size of each operation window 131 is greater than a width of a hand of most skilled persons.

The foregoing describes the structure of the accommodation chamber 1, and the following describes a structure of the sealing cap 2.

The operation window 131 on the side wall 13 can allow a skilled person to perform the wiring work, but also let dust, rain, and the like enter the accommodation chamber 1. To avoid this situation, correspondingly, the junction box further includes the sealing cap 2. The sealing cap 2 may be hooded on the accommodation chamber 1. As shown in FIG. 4, when the sealing cap 2 is hooded on the accommodation chamber 1, the sealing cap 2 can shield all operation windows 131.

During implementation, the sealing cap 2 may be a rectangular foldable sheet structure. After completing the wiring work for the electronic device, the skilled person may wind the sealing cap around the side wall 13 of the accommodation chamber 1, so that the sealing cap 2 can shield all the operation windows 131. In this case, after the sealing cap of the sheet structure is winded around the side wall 13, the third through-hole 201 of the sealing cap 2 may be a through-hole formed by an edge far away from the base 12, and the fourth through-hole 202 is a through-hole formed by an edge close to the base 12.

In some embodiments, the sealing cap 2 may alternatively be in another form. For example, the sealing cap 2 may include a cap wall 21. The cap wall 21 is taller than the side wall 13 of the accommodation chamber 1. Therefore, when the sealing cap 2 is installed to the accommodation chamber 1, the cap wall 21 of the sealing cap 2 can wrap the side wall 13 within the sealing cap 2. Further, the operation window 131 on the side wall 13 is also located within the sealing cap 2.

The sealing cap 2 may be made of a stretchable material, for example, may be made of elastic plastic. A shape of sealing cap 2 is adapted to a shape of the accommodation chamber 1. For example, the shape of the accommodation chamber 1 is tubular. Correspondingly, the sealing cap 2 may also be of a tubular structure, and is sleeved on the side wall 13 of the accommodation chamber 1 to shield the operation window 131 on the side wall 13.

Figure 5:
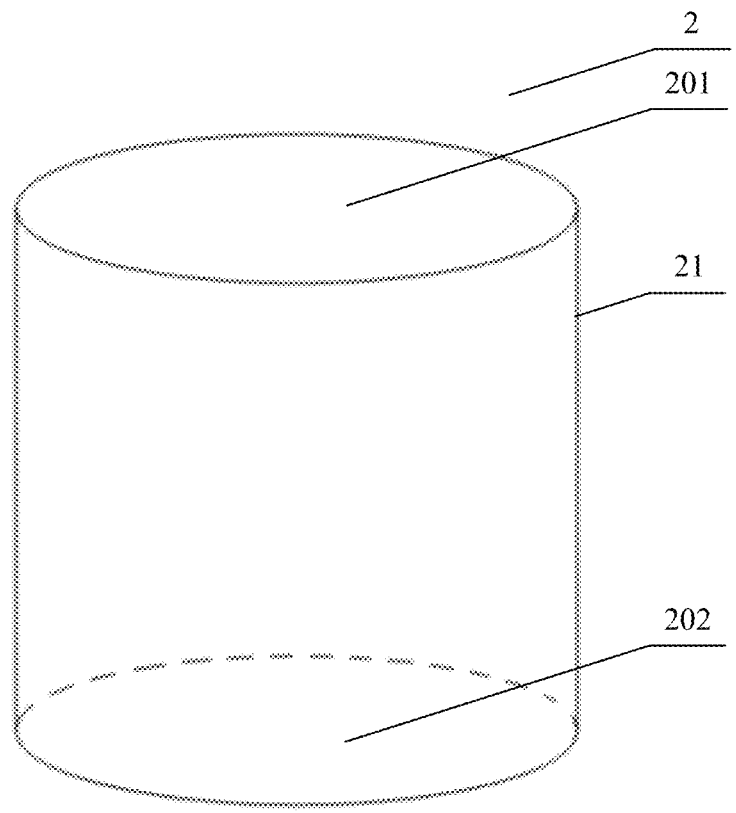
FIG. 5 is a schematic structural diagram of a sealing cap of a junction box according to an embodiment of this application.

For example, as shown in FIG. 5, the sealing cap 2 may be a sleeve that is sleeved on the side wall 13 of the accommodation chamber 1. In this case, the third through-hole 201 may be formed by the edge of the cap wall 21 that is far away from the base 12, and the fourth through-hole 202 may be formed by the edge of the cap wall 21 that is close to the base 12.

Figure 6:
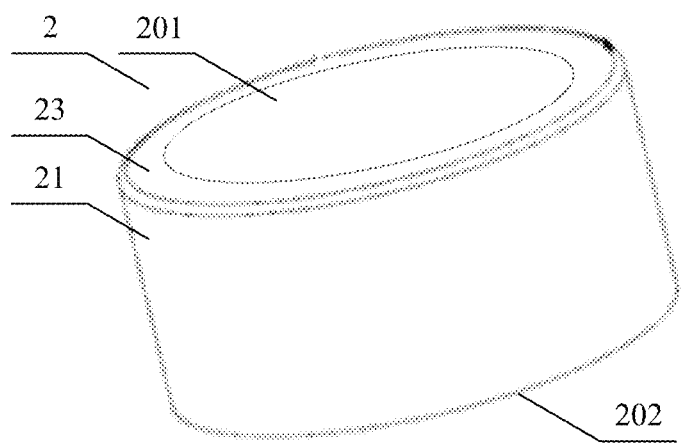
FIG. 6 is a schematic structural diagram of a sealing cap of a junction box according to an embodiment of this application.

For another example, as shown in FIG. 6, the sealing cap 2 may alternatively be of a structure having the cap wall 21 and a cap brim 23. The cap brim 23 is configured to enable the sealing cap 2 to be fastened to the upper cover 11 of the accommodation chamber 1. For example, the cap brim 23 is hung on the upper cover 11 of the accommodation chamber 1. Then, to improve stability of the sealing cap 2 and the accommodation chamber 1, the cap brim 23 of the sealing cap 2 may be fastened to the upper cover 11 of the accommodation chamber 1 by using a screw.

In some embodiments, to prevent rain and the like from entering the accommodation chamber 1 from the position at which the sealing cap 2 is installed to the accommodation chamber 1, correspondingly, as shown in FIG. 2, the sealing cap 2 includes a cap cover 22, and the cap cover 22 is fastened to an end portion of the cap wall 21. The third through-hole 201 is provided on the cap cover 22, and the third through-hole 201 is for wiring, that is, for avoiding the first through-hole 111. The fourth through-hole 202 is formed by an edge of the cap wall 21 that is far away from the cap cover 22. The cap cover 22 of the sealing cap 2 is detachably installed to the upper cover 11 of the accommodation chamber 1. As shown in FIG. 4, the cap wall 21 of the sealing cap 2 is attached to the side wall 13 of the accommodation chamber 1 when the cap cover 22 and the upper cover 11 are in an installed state.

During implementation, the upper cover 11 of the accommodation chamber 1 is provided with a first through-hole 111 for wiring. Therefore, correspondingly, when the sealing cap 2 is hooded on the accommodation chamber 1, the position that is on the cap cover 22 and that corresponds to the first through-hole 111 also needs to be provided with a through-hole, namely, the third through-hole 201, so that wiring is not blocked, and a client cable can be passed through the third through-hole 201 on the cap cover 22 and the first through-hole 111 on the upper cover 11 and enters the accommodation chamber 1.

Similarly, the fourth through-hole 202 of the sealing cap 2 is also for wiring, so that a device-end cable can be passed through the fourth through-hole 202 on the sealing cap 2 and the second through-hole 121 on the base 12 and enters the accommodation chamber 1.

If the upper cover 11 is not provided with the first installation tube 112, correspondingly, a size of the third through-hole 201 is adapted to a size of the first through-hole 111. For example, a diameter of the third through-hole 201 is equal to or slightly greater than a diameter of the first through-hole 111. However, as shown in FIG. 2, if the upper cover 11 is provided with the first installation tube 112, correspondingly, a size of the third through-hole 201 is adapted to a size of the first installation tube 112. For example, a diameter of the third through-hole 201 is greater than or slightly greater than an outer diameter of the first installation tube 112.

Because the fourth through-hole 202 of the sealing cap 2 is formed by the edge of the cap wall 21 of the sealing cap 2, a diameter of the fourth through-hole 202 is equal to a circumferential size of the cap wall 21. Therefore, if the base 12 is not provided with the second installation tube 122, the diameter of the fourth through-hole 202 is greater than a diameter of the second through-hole 121. If the base 12 is provided with the second installation tube 122, the diameter of the fourth through-hole 202 is greater than an outer diameter of the second installation tube 122.

As described above, the sealing cap 2 is detachably installed to the accommodation chamber 1. For example, the cap cover 22 of the sealing cap 2 is provided with a screw hole, and the upper cover 11 of the accommodation chamber 1 is provided with a screw hole, so that the cap cover 22 is installed to the upper cover 11 by using a screw.

In this way, when a skilled person needs to perform wiring on the electronic device, the skilled person may unscrew the screw on the cap cover 22 and the upper cover 11 to remove the sealing cap 2 from the accommodation chamber 1, for example, to remove the sealing cap 2 towards the tubular support of the pole. Next, the skilled person may stretch the hands into the accommodation chamber 1 through the operation window 131 on the side wall 13 to perform the wiring work. After completing the wiring work, the skilled person may hood the sealing cap 2 on the accommodation chamber 1, and fasten the sealing cap 2 to the accommodation chamber 1 by using a screw.

To prevent dust, rain, and the like from entering the accommodation chamber 1 through a gap between the sealing cap 2 and the accommodation chamber 1, correspondingly, the cap wall 21 of the sealing cap 2 is attached to the side wall 13 of the accommodation chamber 1 when the sealing cap 2 is installed to the accommodation chamber 1. For example, an inner surface of the cap wall 21 is attached to an outer surface of the side wall 13.

The foregoing describes the structure of the sealing cap 2, and the following describes the technical means used in waterproofing of the junction box.

In some embodiments, to prevent dust, rain, and the like from entering the accommodation chamber 1 through the gap between the cap cover 22 of the sealing cap 2 and the upper cover 11 of the accommodation chamber 1, correspondingly, as shown in FIG. 2, the upper cover 11 is provided with a first ring groove 113, a first sealing ring 3 is placed in the first ring groove 113, and the first sealing ring 3 is located between the cap cover 22 of the sealing cap 2 and the upper cover 11 of the accommodation chamber 1 when the cap cover 22 and the upper cover 11 are in an installed state.

During implementation, an outer surface of the upper cover 11 (that is, the surface outside the accommodation chamber 1) is provided with the first ring groove 113. An inner diameter of the first ring groove 113 is greater than a diameter of the third through-hole 201 on the cap cover 22, so that the first sealing ring 3 placed in the first ring groove 113 is pressed between the cap cover 22 and the upper cover 11 when the cap cover 22 and the upper cover 11 are in the installed state. In addition, a thickness of the first sealing ring 3 is greater than a groove depth of the first ring groove 113, so that the first sealing ring 3 can have a sealing function between the cap cover 22 and the upper cover 11.

In some embodiments, in application, if there is rain on an outer surface of the cap wall 21, rain at a lower edge of the cap wall 21 flows back into the gap between the cap wall 21 and the side wall 13, and further, flows upwards by a distance along an inner surface of the cap wall 21, to avoid entering the accommodation chamber 1 through the operation window 131. Correspondingly, a distance between an edge of the operation window 131 that is close to the base 12 and the base 12 is greater than a target value. For example, as shown in FIG. 2, the distance d is greater than the target value.

That is, when the distance between the edge of the operation window 131 that is close to the base 12 (namely, a lower edge of the operation window 131) and the base 12 is relatively large, rain on the inner surface of the cap wall 21 does not flow upwards that far, thereby preventing the water on the inner surface of the cap wall 21 from entering the accommodation chamber 1 through the operation window 131.

The distance between the lower edge of the operation window 131 and the base 12 may be determined based on a maximum distance by which water flows upwards. For example, a minimum distance between the lower edge of the operation window 131 and the base 12 is greater than the maximum distance by which water flows upwards. For example, the distance between the lower edge of the operation window 131 and the base 12 may be set to 15 millimeters or the like.

Figure 7:
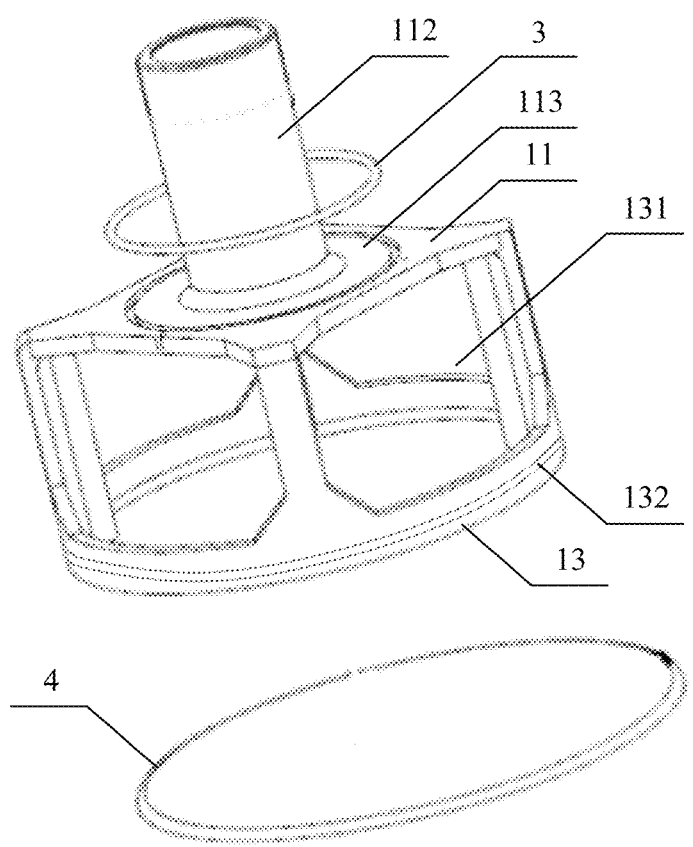
FIG. 7 is a schematic structural diagram of a junction box according to an embodiment of this application.

In some embodiments, to prevent dust, rain, and the like from entering the accommodation chamber 1 through the gap between the cap wall 21 of the sealing cap 2 and the side wall 13 of the accommodation chamber 1, correspondingly, as shown in FIG. 7, the side wall 13 of the accommodation chamber 1 is provided with a second ring groove 132, and the second ring groove 132 is located between the operation window 131 and an end portion of the side wall 13 that is close to the base 12. A second sealing ring 4 is placed in the second ring groove 132, and the second sealing ring 4 is located between the cap wall 21 of the sealing cap 2 and the side wall 13 of the accommodation chamber 1 when the accommodation chamber 1 and the sealing cap 2 are in an installed state.

During implementation, an outer surface of the side wall 13 (that is, the surface outside the accommodation chamber 1) is provided with the second ring groove 132, and the second ring groove 132 is formed around the outer surface of the side wall 13. A distance between a lower groove wall of the second ring groove 132 and the base 12 is less than a distance between a lower edge of the cap wall 21 and the base 12 when the sealing cap 2 and the accommodation chamber 1 are in the installed state, so that the second sealing ring 4 placed in the second ring groove 132 is pressed between the cap wall 21 and the side wall 13. In addition, a thickness of the second sealing ring 4 is greater than a groove depth of the second ring groove 132, so that the second sealing ring 4 can have a sealing function between the cap wall 21 and the side wall 13.

In addition, the second sealing ring 4 in the second ring groove 132 can further prevent water on the inner surface of the cap wall 21 from flowing upwards to enter the accommodation chamber 1.

In some embodiments, the accommodation chamber 1 of the junction box not only can be used for wiring and hiding wires, but also can be used for placing an expansion component of the electronic device.

The expansion component may be one or more of a Bluetooth component, a Wi-Fi (Wireless Fidelity) component, a GPS (Global Positioning System) component, and the like.

During implementation, for an electronic device that does not have some functions, to enable the electronic device to have the functions, the electronic device may be modified. For example, for an electronic device that does not have a Bluetooth function, a Bluetooth component may be added to an accommodation chamber 1. In a related technology, before a function of an electronic device is expanded, a structure of the electronic device needs to be changed to accommodate an expansion component. However, in this solution, the expansion component may be directly placed in the junction box, and a structure of the electronic device does not need to be changed, thereby simplifying a modification process of the electronic device.

In some embodiments, the sealing cap 2 may be made of an isolating material, for example, may be made of a non-metallic material, a plastic material, or a ceramic material.

During implementation, the non-metallic sealing cap 2 can prevent corrosion and rust, and furthermore, can prevent a signal from being shielded when the junction box is configured to accommodate an expansion component.

Figure 8:
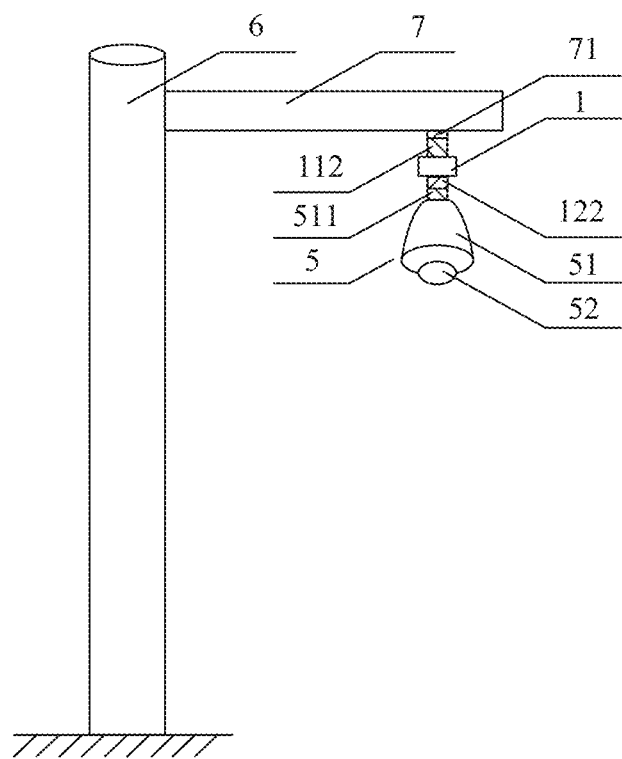
FIG. 8 is a schematic structural diagram of an electronic device assembly system according to an embodiment of this application.

Based on the foregoing structure, in a process of installing the electronic device on the pole, a skilled person may first perform a fastening work, and then performs a wiring work, which may be as follows:

A process of the fastening work may be: As shown in FIG. 8, the skilled person may first install the junction box on the pole 6. For example, the tubular support 7 is installed at an end portion of the pole 6 that is far away from the ground. The tubular support 7 may be perpendicular to the pole 6. An end portion of the tubular support 7 that is far away from the pole 6 is vertically provided with a connection tube 71. The first installation tube 112 on the upper cover 11 of the junction box may be fastened to the connection tube 71. Then, the skilled person fastens the electronic device 5 to the second installation tube 122 on the base 12 of the junction box. For example, a housing 51 of the electronic device may be provided with a third installation tube 511 adapted to the second installation tube 122, and the third installation tube 511 of the electronic device is fastened to the second installation tube 122, so that the electronic device 5 is fastened to the junction box.

A process of the wiring work may be: After fastening the electronic device 5 to the pole by using the junction box, the skilled person performs the wiring work, which may be as follows: sequentially passing the wire in the pole through the tubular support 7, the connection tube 71, the third through-hole 201 of the sealing cap 2, and the first through-hole 111 of the accommodation chamber 1 into the accommodation chamber 1; sequentially passing the wire in the electronic device through the third installation tube 511 on the housing 51 of the electronic device, the fourth through-hole 202 of the sealing cap 2, and the second through-hole 121 of the accommodation chamber 1 into the accommodation chamber 1. The skilled person detaches the sealing cap 2 hooded on the accommodation chamber 1, that is, removes the screw for fastening the sealing cap 2 and the accommodation chamber 1, and then removes the sealing cap 2 towards the tubular support 7, so that the operation window 131 of the side wall 13 of the accommodation chamber 1 is unshielded. Next, the skilled person passes the hands through the operation window 131 to perform the wiring work on the wire in the accommodation chamber 1, so as to connect the wire of the electronic device to the wire in the pole.

As can be learned from the foregoing, first, the electronic device is fastened to the pole; and then, the wiring work is performed. Therefore, when the skilled person performs the wiring work, because the electronic device has been fastened to the pole, another skilled person does not need to hold the electronic device. In this way, one skilled person can complete the installation work of the electronic device without assistance of another skilled person, thereby simplifying the installation process of the electronic device and improving work efficiency.

In the embodiments of this application, the junction box includes the accommodation chamber and the sealing cap. The upper cover of the accommodation chamber is provided with the first through-hole for wiring, and the base of the accommodation chamber is provided with the second through-hole for wiring. The side wall of the accommodation chamber is provided with one or more operation windows, the upper cover of the accommodation chamber is provided with the first installation position for installing to the pole, and the base of the accommodation chamber is provided with the second installation position for installing to the electronic device. The sealing cap is detachably installed to the accommodation chamber. The at least one operation window is shielded by the sealing cap when the sealing cap and the accommodation chamber are in an installed state. When the electronic device is installed by using the junction box, the skilled person may lead a wire out of the electronic device into the accommodation chamber, and lead a wire out of the pole into the accommodation chamber. Then, the skilled person fastens the upper cover of the accommodation chamber to the pole, and fastens the electronic device to the base of the accommodation chamber, so that the electronic device is fixedly installed to the pole by using the junction box. Subsequently, the skilled person can stretch the hands into the accommodation chamber through the operation window to perform the wiring work. As can be learned, in the process of installing the electronic device, one skilled person can complete installation of the electronic device without assistance of another skilled person, thereby simplifying the installation process of the electronic device and improving work efficiency.

The embodiments further provide an electronic device assembly system. As shown in FIG. 8, the electronic device assembly system includes an electronic device 5, a pole 6, a tubular support 7, and the foregoing junction box. The tubular support 7 is vertically installed on the pole 6, the upper cover 11 of the junction box is fastened to the tubular support 7 at the first installation position, and the base 12 of the junction box is fastened to the electronic device 5 at the second installation position The electronic device may be any device disposed in the air by using the pole, such as a smart street lamp or a camera device. In this embodiment, an example in which the electronic device is a camera device may be used for illustration.

For example, as shown in FIG. 8, the electronic device may include a housing 51 and a camera 52. The camera 52 may be installed in the housing 51. The housing 51 may be provided with a third installation position adapted to the second installation position on the base 12 of the junction box, so that the base 12 of the junction box can be fastened to the housing 51 through cooperation of the second installation position and the third installation position.

As described above, the first installation position may be a first installation structure, and the second installation position may be a second installation structure. Correspondingly, the third installation position may be a third installation structure, which may be one of a thread structure, a welding position, a buckle structure, or a clamp structure.

The pole 6 is of a tubular structure. The pole 6 and the tubular support 7 are communicated with the accommodation chamber 1 of the junction box. In this way, a wire led from a client (e.g., a terminal device, a power supply device, or the like) may enter the accommodation chamber 1 through the pole 6 and the tubular support 7, and is connected to the electronic device. For example, the wire of the electronic device may be led into the accommodation chamber 1, so that the wire of the client and the wire of the electronic device are gathered in the accommodation chamber 1, and a skilled person can electrically connect the client to the electronic device in the accommodation chamber 1, that is, perform a wiring work.

During implementation, as shown in FIG. 8, the pole 6 is fastened to the ground, and the tubular support 7 is fastened to the pole 6. For example, the tubular support 7 is fastened to an end portion of the pole 6 that is far away from the ground. The upper cover 11 of the junction box is fastened to the tubular support 7 at the first installation position. For example, an end portion of the tubular support 7 that is far away from the pole 6 is provided with a connection tube 71. The upper cover 11 of the junction box is fastened to the connection tube 71 at the first installation position. For example, the first installation tube 112 on the upper cover 11 is fastened to the connection tube 71.

As shown in FIG. 8, the top of the electronic device is fastened to the bottom of the junction box. For example, the base 12 of the junction box is provided with the second installation tube 122, and the housing 51 of the electronic device 5 is provided with a third installation tube 511. Further, the second installation tube 122 and the third installation tube 511 may be provided with threads that match with each other. For example, the second installation tube 122 is provided with an internal thread (namely, the second installation position), and the third installation tube 511 is provided with an external thread (namely, the third installation position), so that the second installation tube 122 may be connected to the third installation tube 511 through the threads. In this way, the electronic device 5 is fastened to the junction box.

Based on the foregoing descriptions, when a skilled person installs the electronic device, a possible installation process may be: First, the skilled person fastens the pole 6 to the ground; then, fixedly installs the tubular support 7 to the end portion of the pole 6 that is far away from the ground; next, fastens the top of the junction box to the tubular support 7, for example, may install the first installation tube 112 on the upper cover to the connection tube 71 of the tubular support 7 through a thread; and subsequently, may lead the wire led out of the pole into the accommodation chamber of the junction box, and lead a wire led out of the electronic device into the accommodation chamber of the junction box.

After the foregoing process, the skilled person subsequently installs the electronic device to the bottom of the junction box. For example, the electronic device is a camera device. The skilled person fastens the third installation tube 511 to the housing 51 to the second installation tube 122 of the base 12 of the junction box. After completing fastening and installation of the electronic device and wire leading, the skilled person then performs a wiring work. For example, the skilled person may fasten the detached sealing cap 2 to the accommodation chamber 1, and move the sealing cap 2 towards the tubular support 7. Then, the skilled person may stretch the hands into the accommodation chamber 1 through the operation window 131 of the accommodation chamber 1 to perform the wiring work. As can be learned, in the wiring process, the skilled person does not require assistance of another skilled person, thereby simplifying the installation process of the electronic device and improving work efficiency.

The foregoing installation manner of the skilled person is merely an example for illustration, and does not constitute a specific limitation. The skilled person may install the electronic device assembly system based on actual situations.

In a possible implementation, the electronic device assembly system further includes an expansion component. The expansion component is located in the junction box, and the expansion component is electrically connected to the electronic device.

The expansion component may be one or more of a Bluetooth component, a Wi-Fi component, a GPS component, and the like.

During implementation, for an electronic device that does not have some functions, to enable the electronic device to have the functions, the electronic device may be modified. For example, for a camera device that does not have a Bluetooth function, a Bluetooth component may be added to an accommodation chamber 1. The Bluetooth component is electrically connected to the camera device. In a related technology, before a function of an electronic device is expanded, a structure of the electronic device needs to be changed to accommodate an expansion component. However, in this solution, the expansion component may be directly placed in the junction box, and a structure of the electronic device does not need to be changed, thereby simplifying a modification process of the electronic device.

In the embodiments of this application, as described above, the junction box in the electronic device assembly system may include the accommodation chamber and the sealing cap. The upper cover of the accommodation chamber is provided with the first through-hole for wiring, and the base of the accommodation chamber is provided with the second through-hole for wiring. The side wall of the accommodation chamber is provided with one or more operation windows, the upper cover of the accommodation chamber is provided with the first installation position for installing to the pole, and the base of the accommodation chamber is provided with the second installation position for installing to the electronic device. The sealing cap is detachably installed to the accommodation chamber. The at least one operation window is shielded by the sealing cap when the sealing cap and the accommodation chamber are in an installed state. When the electronic device is installed by using the junction box, the skilled person may lead a wire out of the electronic device into the accommodation chamber, and lead a wire out of the pole into the accommodation chamber. Then, the skilled person fastens the upper cover of the accommodation chamber to the pole, and fastens the electronic device to the base of the accommodation chamber, so that the electronic device is fixedly installed to the pole by using the junction box. Subsequently, the skilled person can stretch the hands into the accommodation chamber through the operation window to perform the wiring work. As can be learned, in the process of installing the electronic device, one skilled person can complete installation of the electronic device without assistance of another skilled person, thereby simplifying the installation process of the electronic device and improving work efficiency.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A junction box, comprising:
   an accommodation chamber configured to accommodate a wire, wherein the accommodation chamber comprises:
   an upper cover having a first through-hole for wiring,
   a base having a second through-hole for wiring, and
   a side wall having one or more operation windows, wherein the upper cover is provided with a first installation position for installing to a pole, and the base is provided with a second installation position for installing to an electronic device; and
   a sealing cap configured to seal the wire, wherein the sealing cap comprises:
   a third through-hole for wiring and a fourth through-hole for wiring, and
   a cap wall, wherein a height of the cap wall is greater than or equal to a height of the side wall of the accommodation chamber, the sealing cap is detachably installed to the accommodation chamber, and the one or more operation windows are shielded by the sealing cap when the sealing cap and the accommodation chamber are in an installed state.

2. The junction box according to claim 1, wherein the sealing cap further comprises a cap cover, and the cap cover is fastened to an end portion of the cap wall;
   the third through-hole is provided on the cap cover, a diameter of the third through-hole is greater than or equal to a diameter of the first through-hole, and the fourth through-hole is formed by an edge of the cap wall that is far away from the cap cover; and
   the cap cover of the sealing cap is detachably installed to the upper cover of the accommodation chamber, and the cap wall of the sealing cap is attached to the side wall of the accommodation chamber when the cap cover and the upper cover are in an installed state.

3. The junction box according to claim 2, wherein the upper cover is provided with a first ring groove, and a first sealing ring is placed in the first ring groove; and
   the first sealing ring is located between the cap cover of the sealing cap and the upper cover of the accommodation chamber when the cap cover and the upper cover are in the installed state.

4. The junction box according to claim 1, wherein the side wall of the accommodation chamber is provided with a second ring groove, and the second ring groove is located between the one or more operation windows and an end portion of the side wall that is close to the base; and
   a second sealing ring is placed in the second ring groove, and the second sealing ring is located between the cap wall of the sealing cap and the side wall of the accommodation chamber when the accommodation chamber and the sealing cap are in the installed state.

5. The junction box according to claim 4, wherein the sealing cap is made of a non-metallic material.

6. A junction box, comprising:
   an accommodation chamber configured to accommodate a wire, wherein the accommodation chamber comprises:
   an upper cover having a first through-hole for wiring,
   a base having a second through-hole for wiring, and
   a side wall having one or more operation windows, wherein the upper cover is provided with a first installation position for installing to a pole, and the base is provided with a second installation position for installing to an electronic device; and
   a sealing cap configured to seal the wire, wherein the sealing cap comprises:
   a third through-hole for wiring and a fourth through-hole for wiring,
   wherein the sealing cap is detachably installed to the accommodation chamber, and the one or more operation windows are shielded by the sealing cap when the sealing cap and the accommodation chamber are in an installed state,
   wherein a position that is on the upper cover and that corresponds to the first through-hole is provided with a first installation tube, and a position that is on the base and that corresponds to the second through-hole is provided with a second installation tube; and
   the first installation position is provided at a nozzle position of the first installation tube that is far away from the upper cover, and the second installation position is provided at a nozzle position of the second installation tube that is far away from the base.

7. The junction box according to claim 6, wherein a distance between an edge of the one or more operation windows that is close to the base and the base is greater than a target value.

8. An electronic device assembly system, comprising:
   an electronic device;
   a pole;
   a tubular support vertically installed on the pole; and
   a junction box comprising an accommodation chamber configured to accommodate a wire, wherein the accommodation chamber comprises:
   an upper cover having a first through-hole for wiring,
   a base having a second through-hole for wiring, and
   a side wall having one or more operation windows, wherein the upper cover is provided with a first installation position for installing to the tubular support, and the base is provided with a second installation position for installing to the electronic device; and a sealing cap configured to seal the wire, wherein the sealing cap comprises:

a third through-hole for wiring and a fourth through-hole for wiring, the sealing cap is detachably installed to the accommodation chamber, and a cap wall, wherein a height of the cap wall is greater than or equal to a height of the side wall of the accommodation chamber, the sealing cap is detachably installed to the accommodation chamber, and the one or more operation windows are shielded by the sealing cap when the sealing cap and the accommodation chamber are in an installed state.

9. The electronic device assembly system according to claim 8, further comprising an expansion component, wherein the expansion component is located in the junction box, and the expansion component is electrically connected to the electronic device.

10. The electronic device assembly system according to claim 9, wherein the expansion component is one or more of a Bluetooth component, a wireless fidelity (Wi-Fi) component, and a global positioning system GPS component.

11. The electronic device assembly system according to claim 10, wherein the electronic device is a camera device, the electronic device comprises a housing and a camera, and the camera is installed in the housing; and the housing is provided with a third installation position adapted to the second installation position of the base, and the base of the junction box is fastened to the housing of the electronic device through cooperation of the second installation position and the third installation position.

12. The electronic device assembly system according to claim 8, wherein a distance between an edge of the one or more operation windows that is close to the base and the base is greater than a target value.

13. The electronic device assembly system according to claim 8, wherein the sealing cap further comprises a cap cover, and the cap cover is fastened to an end portion of the cap wall;

the third through-hole is provided on the cap cover, a diameter of the third through-hole is greater than or equal to a diameter of the first through-hole, and the fourth through-hole is formed by an edge of the cap wall that is far away from the cap cover; and the cap cover of the sealing cap is detachably installed to the upper cover of the accommodation chamber, and the cap wall of the sealing cap is attached to the side wall of the accommodation chamber when the cap cover and the upper cover are in an installed state.

14. The electronic device assembly system according to claim 13, wherein the upper cover is provided with a first ring groove, and a first sealing ring is placed in the first ring groove; and the first sealing ring is located between the cap cover of the sealing cap and the upper cover of the accommodation chamber when the cap cover and the upper cover are in the installed state.

15. The electronic device assembly system according to claim 8, wherein the side wall of the accommodation chamber is provided with a second ring groove, and the second ring groove is located between the one or more operation windows and an end portion of the side wall that is close to the base; and a second sealing ring is placed in the second ring groove, and the second sealing ring is located between the cap wall of the sealing cap and the side wall of the accommodation chamber when the accommodation chamber and the sealing cap are in the installed state.

16. The electronic device assembly system according to claim 8, wherein the sealing cap is made of a non-metallic material.

* * * * *